United States Patent
Hinderliter

(10) Patent No.: US 11,001,389 B2
(45) Date of Patent: May 11, 2021

(54) PROPULSION ENGINE THERMAL MANAGEMENT SYSTEM

(71) Applicant: General Electric Company, Schenectady, NY (US)

(72) Inventor: Kevin Edward Hinderliter, Cincinnati, OH (US)

(73) Assignee: General Electric Company, Schenectady, NY (US)

(*) Notice: Subject to any disclaimer, the term of this patent is extended or adjusted under 35 U.S.C. 154(b) by 0 days.

(21) Appl. No.: 16/204,094

(22) Filed: Nov. 29, 2018

(65) Prior Publication Data
US 2020/0172259 A1    Jun. 4, 2020

(51) Int. Cl.
| | | |
|---|---|---|
| *B64D 33/08* | (2006.01) | |
| *B64C 11/16* | (2006.01) | |
| *B64D 13/00* | (2006.01) | |
| *B64D 27/16* | (2006.01) | |
| *B64D 27/24* | (2006.01) | |

(52) U.S. Cl.
CPC .............. *B64D 33/08* (2013.01); *B64C 11/16* (2013.01); *B64D 13/006* (2013.01); *B64D 27/16* (2013.01); *B64D 27/24* (2013.01)

(58) Field of Classification Search
CPC ... B64D 27/24; B64D 2027/026; B64C 11/16; B64C 11/24; F04D 29/5806; F04D 29/584; F04D 29/321; F04D 29/325; F04D 29/38
See application file for complete search history.

(56) References Cited

U.S. PATENT DOCUMENTS

| | | | |
|---|---|---|---|
| 2,774,552 A | 12/1956 | Glad | |
| 3,575,528 A | 4/1971 | Beam et al. | |
| 4,893,987 A | 1/1990 | Lee et al. | |
| 6,004,095 A * | 12/1999 | Waitz | B64C 21/025 415/119 |
| 6,203,269 B1 | 3/2001 | Lorber et al. | |
| 6,966,174 B2 | 11/2005 | Paul | |
| 7,607,286 B2 | 10/2009 | Suciu et al. | |
| 7,980,054 B2 | 7/2011 | Suciu et al. | |
| 8,459,966 B2 * | 6/2013 | Hipsky | B64D 13/00 417/325 |

(Continued)

FOREIGN PATENT DOCUMENTS

| | | |
|---|---|---|
| EP | 1159533 A1 | 8/2000 |
| EP | 2390178 A2 | 11/2011 |

(Continued)

OTHER PUBLICATIONS

European Search Report Corresponding to Application No. 19206686 dated Apr. 9, 2020.

*Primary Examiner* — Richard A Edgar
(74) *Attorney, Agent, or Firm* — Dority & Manning, P.A.

(57) ABSTRACT

A propulsion engine for an aeronautical vehicle defines a radial direction and a cooling air flowpath. The propulsion engine includes a power source; and a fan including a fan blade rotatable by the power source and extending generally along the radial direction, the fan blade defining an inlet, an outlet, and a cooling air passage extending between the inlet and the outlet and in airflow communication with the cooling air flowpath, the inlet being positioned inward from the outlet along the radial direction to provide a cooling airflow through the cooling air flowpath.

16 Claims, 6 Drawing Sheets

(56) References Cited

U.S. PATENT DOCUMENTS

| | | |
|---|---|---|
| 8,840,371 B2 | 9/2014 | Simpson et al. |
| 9,909,494 B2 | 3/2018 | Roberge |
| 2003/0192303 A1 | 10/2003 | Paul |
| 2003/0192304 A1 | 10/2003 | Paul |
| 2004/0025490 A1 | 2/2004 | Paul |
| 2010/0083632 A1* | 4/2010 | Foster .................... B64D 27/16 60/39.181 |
| 2010/0162680 A1* | 7/2010 | Khalid ..................... B64C 7/02 60/204 |
| 2011/0293421 A1 | 12/2011 | Denner et al. |
| 2012/0107133 A1 | 5/2012 | Bulin et al. |
| 2016/0298544 A1* | 10/2016 | Suciu ..................... B64C 11/14 |
| 2018/0187600 A1 | 7/2018 | Moniz et al. |

FOREIGN PATENT DOCUMENTS

| | | | |
|---|---|---|---|
| EP | 2578803 A2 | | 4/2013 |
| KR | 100622000 B1 | * | 9/2006 |

\* cited by examiner

PROPULSION ENGINE THERMAL MANAGEMENT SYSTEM

FIELD

The present subject matter relates generally to a propulsion engine for an aeronautical vehicle having a thermal management system, and a propulsion system including one or more of such propulsion engines.

BACKGROUND

Distributed electric power propulsion systems for aeronautical vehicles, such as airplanes, have been proposed wherein a plurality of electric propulsors are arranged along, e.g., the lengths of the wings of the aircraft and/or at an empennage of the aircraft. A central electrical power source may be provided to generate or store electric power, and a distribution bus may distribute the electric power to each of the plurality of electric propulsors. Some of these electric propulsion systems may utilize one or more underwing gas turbine engines to generate electric power, or alternatively may have a dedicated turboshaft engine to generate electric power.

Regardless, the electric propulsors generate heat during operation that must be rejected. Proposed systems generally utilize a thermal bus circulating a liquid phase thermal fluid to each of the plurality of electric propulsors to gather heat from the plurality of electric propulsors and reject such heat through one or more heat sinks. However, such systems generally require long lengths of conduit, a large amount of thermal transfer fluid, and accessory systems, together adding weight, cost and complication.

Accordingly, a thermal management system for a distributed electric propulsion system having a reduced complexity, weight, and/or cost would be useful.

BRIEF DESCRIPTION

Aspects and advantages of the invention will be set forth in part in the following description, or may be obvious from the description, or may be learned through practice of the invention.

In one exemplary embodiment of the present disclosure, a propulsion engine is provided for an aeronautical vehicle defining a radial direction and an air flowpath. The propulsion engine includes a power source; and a fan including a fan blade rotatable by the power source and extending generally along the radial direction, the fan blade defining an inlet, an outlet, and an air passage extending between the inlet and the outlet and in airflow communication with the air flowpath, the inlet being positioned inward from the outlet along the radial direction to provide an airflow through the air flowpath.

In certain exemplary embodiments the power source is an electric machine including a rotor and a stator, wherein the air flowpath is a cooling air flowpath in thermal communication with the electric machine, and wherein the fan blade is attached to the rotor of the electric machine.

In certain exemplary embodiments the fan blade of the fan defines an inner end and an outer end along the radial direction, wherein the inlet is defined at the inner end, and wherein the outlet is defined at the outer end.

For example, in certain exemplary embodiments the power source is an electric machine including a rotor and a stator, wherein the inner end of the fan blade is coupled to the rotor of the electric machine, and wherein the fan is configured to induce an airflow through the air flowpath.

In certain exemplary embodiments the propulsion engine includes a cowling, wherein the power source is positioned within the cowling, and wherein the inlet of the fan blade is also positioned within the cowling.

For example, in certain exemplary embodiments the cowling defines an opening, wherein the air flowpath extends between a first end and a second end, wherein the first end is in airflow communication with the opening of the cowling, and wherein the second end is in airflow communication with the inlet of the fan blade.

For example, in certain exemplary embodiments the opening of the cowling is positioned aft of the fan blade of the fan.

In certain exemplary embodiments the power source is an electric machine including a rotor and a stator, wherein the air flowpath of the propulsion engine is a cooling air flowpath defined at least in part by the electric machine and is in thermal communication with the stator of the electric machine.

In certain exemplary embodiments the power source is an electric machine including a rotor and a stator, wherein the fan blade of the fan defines an inner end and an outer end along the radial direction, wherein the inlet is defined at the inner end, wherein the outlet is defined at the outer end, wherein the outer end of the fan blade is coupled to the rotor of the electric machine, and wherein the fan is configured to provide the airflow to the air flowpath of the electric machine.

In certain exemplary embodiments the propulsion engine is an electric fan, and wherein the power source is an electric motor.

In certain exemplary embodiments the power source is an electric machine, wherein the propulsion engine is a gas turbine engine including a fan section and a turbomachine, and wherein the fan section includes the fan and the electric machine.

In certain exemplary embodiments the fan blade is a first fan blade of a plurality of fan blades of the fan, wherein each of the plurality of fan blades of the fan defines a respective inlet, a respective outlet, and a respective air passage extending between the respective inlet and outlet, and wherein each of the respective air passages of the plurality of fan blades is in airflow communication with the air flowpath.

In certain exemplary embodiments the aeronautical vehicle is an airplane, a helicopter, or an unmanned aeronautical vehicle.

In one exemplary embodiment of the present disclosure, an aeronautical vehicle is provided. The aeronautical vehicle includes a fuselage; a wing coupled to and extending from the fuselage; and a propulsion system including one or more propulsion engines coupled to the fuselage, the wing, or both, each of the one or more propulsion engines defining a cooling air flowpath. Each of the of the one or more propulsion engines including a power source; and a fan including a fan blade rotatable by the respective power source and extending generally along the radial direction, the fan blade defining an inlet, an outlet, and a cooling air passage extending between the inlet and the outlet and in airflow communication with the respective cooling air flowpath, the inlet being positioned inward from the outlet along the radial direction to provide a cooling airflow through the cooling air flowpath.

In certain exemplary embodiments the one or more propulsion engines includes at least two propulsion engines.

In certain exemplary embodiments the fan blade of the fan of each propulsion engine defines an inner end and an outer end along the radial direction, wherein the inlet is defined at the inner end, and wherein the outlet is defined at the outer end.

For example, in certain exemplary embodiments the inner end of the fan blade is coupled to the power source, and wherein the fan is configured to induce a cooling airflow through the cooling air flowpath.

In certain exemplary embodiments each propulsion engine includes a cowling, wherein the power source of each propulsion engine is positioned within the cowling, and wherein the inlet of the fan blade of the fan of each propulsion engine is also positioned within the cowling.

For example, in certain exemplary embodiments the cowling of each propulsion engine defines an opening, wherein the cooling air flowpath of each propulsion engine extends between a first end and a second end, wherein the first end is in airflow communication with the opening of the respective cowling, and wherein the second end is in airflow communication with the inlet of the respective fan blade.

In certain exemplary embodiments the fan blade of the fan of each propulsion engine defines an inner end and an outer end along the radial direction, wherein the inlet is defined at the inner end, wherein the outlet is defined at the outer end, wherein the outer end of the fan blade is coupled to the power source of the respective propulsion engine, and wherein the fan of the respective propulsion engine is configured to provide the cooling airflow to the cooling air flowpath of the respective propulsion engine.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Figure 1:
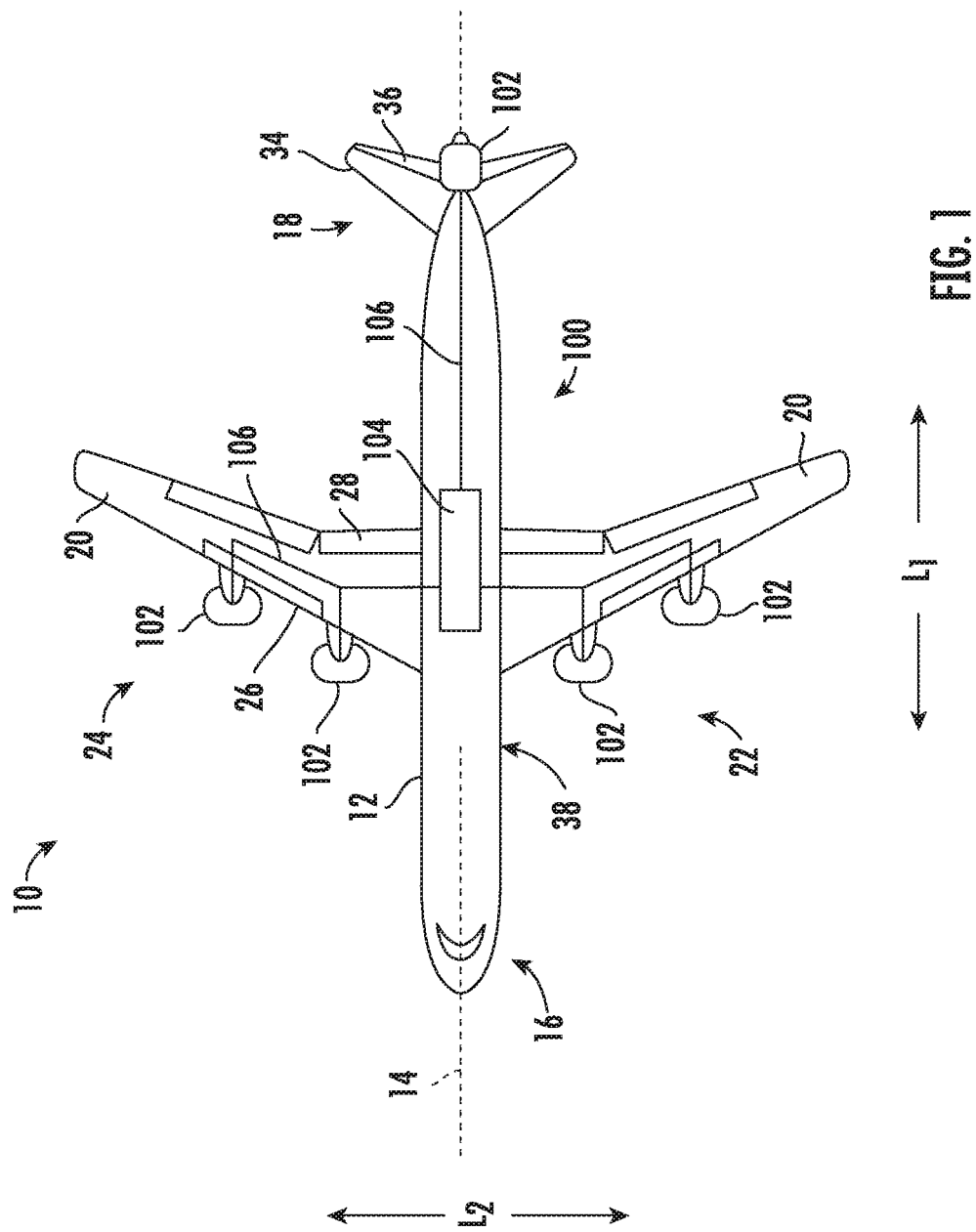
FIG. 1 is a top view of an aircraft according to various exemplary embodiments of the present disclosure.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

The word "exemplary" is used herein to mean "serving as an example, instance, or illustration." Any implementation described herein as "exemplary" is not necessarily to be construed as preferred or advantageous over other implementations.

As used herein, the terms "first", "second", and "third" may be used interchangeably to distinguish one component from another and are not intended to signify location or importance of the individual components.

The terms "forward" and "aft" refer to relative positions within an engine or vehicle, and refer to the normal operational attitude of the engine or vehicle. For example, with regard to an engine, forward refers to a position closer to an engine inlet and aft refers to a position closer to an engine nozzle or exhaust.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "coupled," "fixed," "attached to," and the like refer to both direct coupling, fixing, or attaching, as well as indirect coupling, fixing, or attaching through one or more intermediate components or features, unless otherwise specified herein.

The singular forms "a", "an", and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

Referring now to the drawings, wherein identical numerals indicate the same elements throughout the figures, FIG. 1 provides a top view of an exemplary aircraft 10 as may incorporate various embodiments of the present invention. As shown in FIG. 1, the aircraft 10 defines a longitudinal centerline 14 that extends therethrough, a longitudinal direction L1, a lateral direction L2, a forward end 16, and an aft end 18. Moreover, the aircraft 10 includes a fuselage 12, extending longitudinally from the forward end 16 of the aircraft 10 towards the aft end 18 of the aircraft 10, and a pair of wings 20. The first of such wings 20 extends laterally outwardly with respect to the longitudinal centerline 14 from a port side 22 of the fuselage 12 and the second of such wings 20 extends laterally outwardly with respect to the longitudinal centerline 14 from a starboard side 24 of the fuselage 12. Each of the wings 20 for the exemplary embodiment depicted includes one or more leading edge flaps 26 and one or more trailing edge flaps 28. The aircraft 10 further includes a vertical stabilizer having a rudder flap (not shown) for yaw control, and a pair of horizontal stabilizers 34, each having an elevator flap 36 for pitch control. The fuselage 12 additionally includes an outer surface or skin 38. It should be appreciated however, that in other exemplary embodiments of the present disclosure, the aircraft 10 may additionally or alternatively include any other suitable configuration of stabilizer that may or may not extend directly along the vertical direction or horizontal/lateral direction L2.

The exemplary aircraft 10 of FIG. 1 additionally includes a propulsion system 100, herein referred to as "system 100". The exemplary system 100 includes one or more propulsion engines 102, and more specifically includes a plurality of propulsion engines 102 (such as between two and twenty). For example, the embodiment depicted includes a plurality of propulsion engines 102 arranged along each of the pair of wings 20 in an under-wing configuration and a propulsion engine 102 arranged at the aft end 18 of the aircraft 10 in a boundary layer ingestion configuration, such that the propulsion engine 102 is incorporated into or blended with a tail section at the aft end 18.

In addition, the propulsion system 100 further includes a power source 104 and an electrical power distribution bus 106. For the embodiment shown, the power source 104 is a central power source configured to generate and/or store electrical power. For example, the power source 104 may include one or more gas turbine engines, such as one or more turboshaft engines configured to rotate a respective one or more electric generators. Additionally, or alternatively, the power source 104 may include means for storing electrical power, such as one or more batteries. The electrical power distribution bus 106 is electrically coupled to each of the plurality of propulsion engines 102 and the power source 104, such that the electrical power distribution bus 106 may provide electrical power from the power source 104 to each of the plurality of propulsion engines 102.

It should be appreciated, however, that in other embodiments the electric propulsion system 100 may be configured in any other suitable manner. For example, in other embodiments, the propulsion system 100 may have any other suitable number and/or arrangement of propulsion engines 102. For example, in other exemplary embodiments, the one or more propulsion engines 102 may include fixed propulsion engines (such as is shown), rotating propulsion engines (such as in vertical takeoff and landing aircraft), under-wing mounted propulsion engines (such as is shown), propulsion engines housed within the fuselage 12 or wings 20, etc. Further, the propulsion system 100 may have any other suitable power source 104. For example, in other embodiments, the propulsion system 100 may utilize, e.g., one or more underwing-mounted gas turbine engines to generate thrust for the aircraft 10, as well as to drive one or more electric machines to generate electrical power for the electric propulsion engines 102. Further, although for the embodiment shown the propulsion system 100 is depicted with an aircraft 10 configured as an airplane, in other embodiments, any other suitable aeronautical vehicle may be used. For example, in other embodiments, the propulsion system 100 may instead be operable with a helicopter or other vertical takeoff and landing vehicle, an unmanned aeronautical vehicle, etc.

Figure 2:
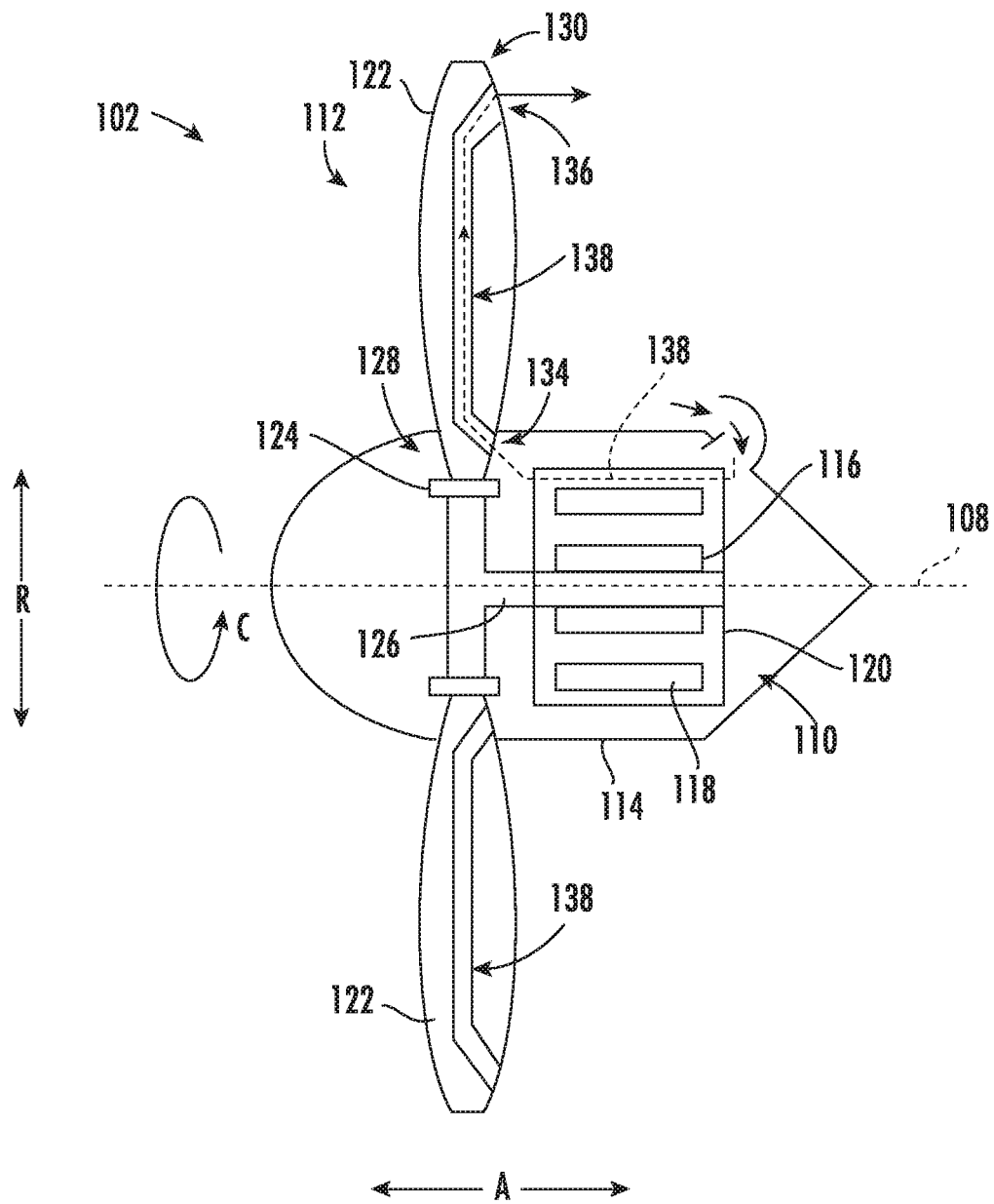
FIG. 2 is a side, schematic view of a propulsion engine in accordance with an embodiment of the present disclosure.

Referring now to FIG. 2, a propulsion engine 102 for an aeronautical vehicle in accordance with an exemplary embodiment of the present disclosure is depicted. For the embodiment depicted, the propulsion engine 102 is configured as an electric fan, as will be appreciated from the discussion below. The exemplary propulsion engine 102 of FIG. 2 may be incorporated into, e.g., the exemplary propulsion system 100 and aircraft 10 described above with reference to FIG. 1. Alternatively, however, the propulsion engine 102 of FIG. 2 may be incorporated into any other suitable propulsion system and/or vehicle.

The propulsion engine 102 defines an axial direction A, a central axis 108 extending along the axial direction A, a radial direction R, and a circumferential direction C. Further, the propulsion engine 102 generally includes an electric machine 110 (which for the embodiment depicted is generally operable as an electric motor), a fan 112, and a cowling 114.

The electric machine 110 includes a rotor 116 and a stator 118, with the rotor 116 rotatable about the axis 108 in the circumferential direction C relative to the stator 118. Further, the rotor 116 and the stator 118 are enclosed within an electric machine casing 120 for the embodiment shown, and the electric machine casing 120 is enclosed within the cowling 114. The electric machine 110 may be configured to receive electrical power from, e.g., a power source of a propulsion system including the exemplary propulsion engine 102 (not shown; see, e.g., power source 104 of propulsion system 100 of FIG. 1). Further, although for the embodiment shown the electric machine 110 is configured as an "in-runner" electric machine 110, with the rotor 116 positioned radially inward of the stator 118, in other embodiments the electric machine 110 may instead be configured as an "out-runner" electric machine 110, with the rotor 116 position radially outward of the stator 118. The electric machine 110 may utilize any suitable electric machine/electric motor technology. For example, the electric machine 110 may be configured as a permanent magnet electric machine, an electromagnet electric machine, an asynchronous electric machine, a synchronous electric machine, an AC electric machine, a DC electric machine, an induction electric machine, a brushed or brushless electric machine, etc.

Referring still to FIG. 2, the fan 112 generally includes a fan blade 122 attached to the rotor 116 of the electric machine 110 and extending generally along the radial direction R. More specifically, the fan 112 further includes a disk 124 and a fan shaft 126, with the fan blade 122 coupled to the disk 124 and the disk 124 coupled to the fan shaft 126. The fan shaft 126 is, in turn, coupled to the rotor 116 of the electric machine 110. In such a manner, rotation of the rotor 116 of the electric machine 110 may correspondingly rotate the fan blade 122 of the fan 112, driving the fan 112 and powering the electric propulsion engine 102.

As will be explained in more detail below, the fan blade 122 defines an inner end 128 and an outer end 130 along the radial direction R. As used herein, the term "inner end" refers to an inner twenty-five percent (25%) of the fan blade 122 (based on a total span of the fan blade 122), and the term outer "outer end" refers to an outer twenty-five percent (25%) of the fan blade 122 (again based on the total span of the fan blade 122).

As will be appreciated, during operation of the propulsion engine 102, the electric machine 110 may generate an amount of heat which needs to be at least in part actively rejected to prevent, or minimize a likelihood of, any damage to the propulsion engine 102. Accordingly, the propulsion engine 102 defines a cooling air flowpath 132 in thermal communication with the electric machine 110. Further, the fan blade 122 of the fan 112 defines an inlet 134, an outlet 136, and a cooling air passage 138 extending between the inlet 134 and the outlet 136 and in airflow communication with the cooling air flowpath 132 of the propulsion engine 102. The inlet 134 of the fan blade 122 is positioned inward from the outlet 136 of the fan blades 122 along the radial direction R to provide a cooling airflow 146 (see FIG. 3) through the cooling air flowpath 132 of the propulsion engine 102, as will be explained in more detail below. More particularly, for the embodiment shown, the inlet 134 is defined at the inner end 128 of the fan blade 122, within the cowling 114, and the outlet 136 is defined at the outer end 130. However, in other embodiments, the inlet 134 and outlet 136 may be defined at other locations, based on, e.g., an amount of airflow desired through the cooling air flowpath 132, as will also be explained in more detail below.

Figure 3:
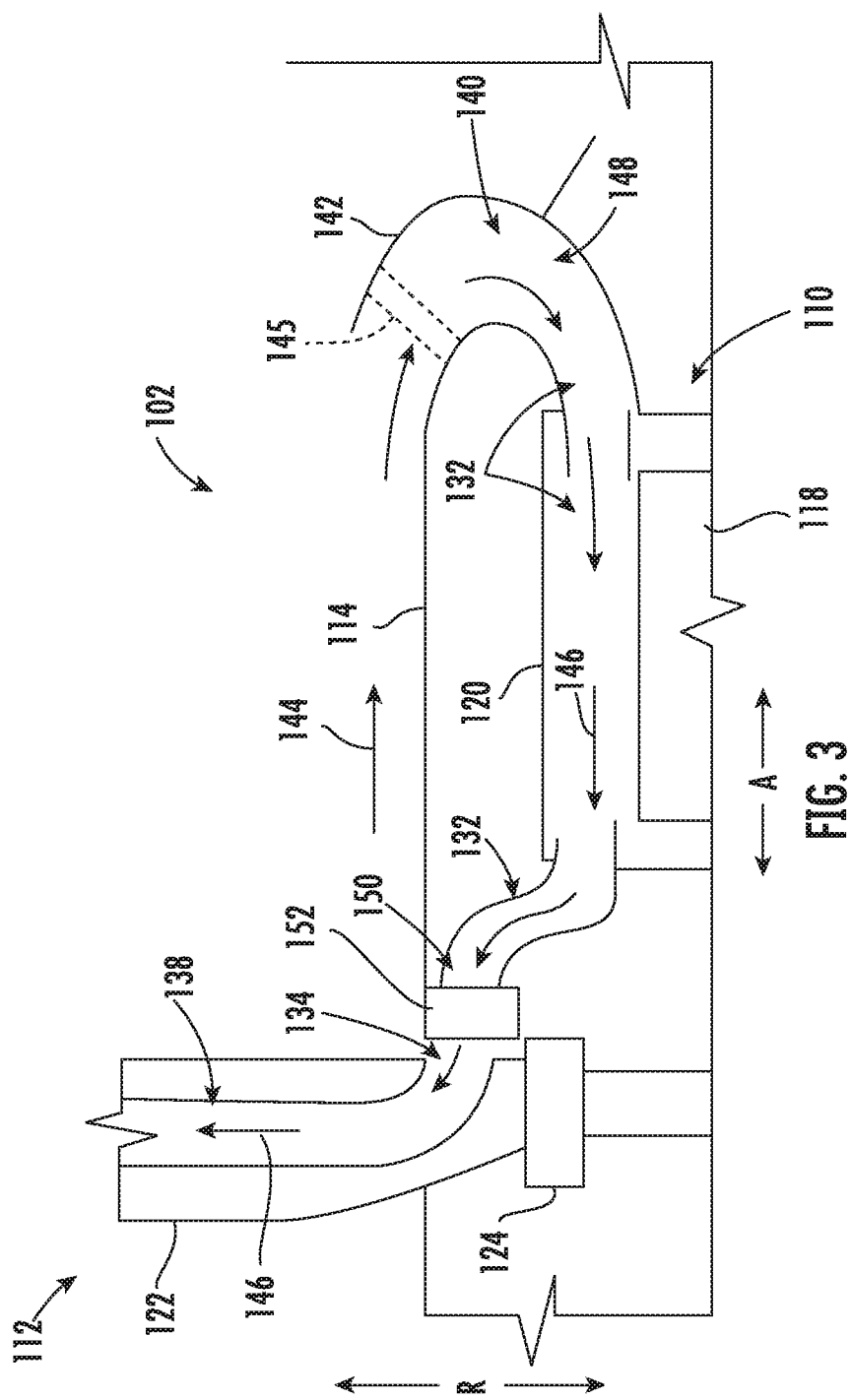
FIG. 3 is a close-up, schematic view of a cooling air flowpath of the propulsion engine of FIG. 2 in accordance with an embodiment of the present disclosure.

Referring now also to FIG. 3, providing a close-up, schematic view of the cooling air flowpath 132 of the exemplary propulsion engine 102 of FIG. 2, it will be appreciated that the cowling 114 of the exemplary propulsion engine 102 depicted defines an opening 140. For the embodiment shown, the opening 140 of the cowling 114 is positioned aft of the fan blade 122 of the fan 112. Further, the cowling 114 includes an inlet scoop 142 for directing an airflow 144 from the fan 112 through the opening 140 in the cowling 114 and into the cooling air flowpath 132 as a cooling airflow 146. Moreover, as is depicted in phantom, in at least certain exemplary embodiments, the propulsion engine 102 may include a flow regulation device 145, such as a valve, louvers, or other suitable device, for selectively allowing (or restricting) an airflow through the cooling air flowpath 132. The flow regulation device 145 may be operable with a controller for, e.g., restricting airflow through the cooling air flowpath 132 during relatively low power operating modes wherein less heat is required to be rejected from the electric motor 110, which may reduce parasitic pumping losses, as will be appreciated from the discussion below. Further, although the cowling 114 includes the inlet scoop 142 for the embodiment shown, in other embodiments, the cowling may instead include a grill, louvers, a combination of any of the foregoing, etc.

As is also depicted, the cooling air flowpath 132 of the propulsion engine 102 extends between a first end 148 (i.e., an inlet for the embodiment shown) and a second end 150 (i.e., an outlet for the embodiment shown). The first end 148 of the cooling air flowpath 132 is in airflow communication with the opening 140 of the cowling 114, and the second end 150 of the cooling air flowpath 132 is in airflow communication with the inlet 134 of the fan blade 122. Moreover, as noted above, the cooling air flowpath 132 is in thermal communication with the electric machine 110. More specifically, for the embodiment shown, the cooling air flowpath 132 of the propulsion engine 102 is defined at least in part by the electric machine 110 and is in thermal communication with the stator 118 of the electric machine 110. More specifically, still, for the embodiment shown the cooling air flowpath 132 extends through the electric machine casing 120 and over the stator 118 of the electric machine 110.

Although a single opening 140 in the cowling 114 and single cooling air flowpath 132 are depicted, in certain embodiments, the cowling 114 may define a plurality of openings 140 spaced along the circumferential direction C, and the cooling air flowpath 132 may include a plurality of cooling air flowpaths 132 similarly spaced along the circumferential direction C. Further, it will be appreciated that the propulsion engine 102 includes a stationary to rotating airflow member 152 at the second end 150 of the cooling air flowpath 132 for rotating the cooling airflow 146 in the circumferential direction C (to match the rotation of the fan blade 122) and for providing such cooling airflow 146 to the inlet 134 of the fan blade 122. For example, the stationary to rotating airflow member 152 may be an inducer, may include a plurality of stator vanes, and/or may have any other suitable structure.

Referring back generally to FIG. 2, it will be appreciated that the fan blade 122 is a first fan blade 122 of a plurality of fan blades 122 of the fan 112. Each of the plurality of fan blades 122 may be spaced generally along the circumferential direction C and attached at a respective inner end 128 to the disk 124. Each of the plurality of fan blades 122 of the fan 112 defines a respective inlet 134, a respective outlet 136, and a respective cooling air passage 138 extending between the respective inlet 134 and outlet 136. Further, each of the respective cooling air passages 138 of the plurality of fan blades 122 is an airflow communication with the cooling air flowpath 132 of the electric machine 110. Notably, however, in other embodiments, only certain of the plurality of fan blades 122 of the fan 112 may define the inlet 134, outlet 136, and cooling air passage 138 described.

During operation of the exemplary propulsion engine 102 depicted in FIGS. 2 and 3, the plurality of fan blades 122 may be rotated at a relatively high rotational speed about the axis 108 in the circumferential direction C by the electric machine 110. Given that the outlet 136 of each fan blade 122 is positioned outward from the inlet 134 of each fan blade 122 along the radial direction R, the fan 112 may act as a centrifuging airflow pump, inducing the cooling airflow 146 through the cooling air flowpath 132 (from opening 140), through the inlet 134 and cooling airflow passage 138 to the outlet 136. In such a manner, wherein the cooling air flowpath 132 of the propulsion engine 102 is positioned upstream of the cooling air passages 138 through the fan blades 122, the fan 112 is configured to induce the cooling airflow 146 through the cooling air flowpath 132 of the propulsion engine 102 during operation. Such may allow for a cooling of the electric machine 110 during operation of the propulsion engine 102, without requiring a separate liquid thermal transfer fluid-based thermal transfer bus (and associated weight, complication, and/or cost) for the propulsion engine 102, or at least requiring a smaller thermal transfer bus for the propulsion engine 102. Such may allow for a lighter overall propulsion system when included as part of, e.g., a distributed electric propulsion system including a multitude of individual electric propulsors.

As noted above, it will be appreciated that although the outlet 136 of each fan blade 122 is defined at the radially outer end 130 and the inlet 134 of each fan blade 122 is defined at the radially inner end 128, in other embodiments, the outlet 136 and/or the inlet 134 may be positioned at any other suitable location so long as the inlet 134 is positioned inward of the outlet 136 along the radial direction R. Varying a separation distance of the inlet 134 and outlet 136 may vary an amount of cooling airflow 146 through the cooling air flowpath 132 of the propulsion engine 102 during operation by varying an amount of delta pressure through the cooling air passages 138. Such may thus vary the amount of cooling of the electric machine 110. In one or more these embodiments, the propulsion engine 102 may be configured to provide at least about 0.5 pounds per second of cooling airflow 146 through the cooling air passage 138 of each fan blade 122 and up to about five (5) pounds per second of cooling airflow 146 through the cooling air passage 138 of each fan blade 122. However, in other embodiments, any other suitable amount of airflow may be provided.

Figure 4:
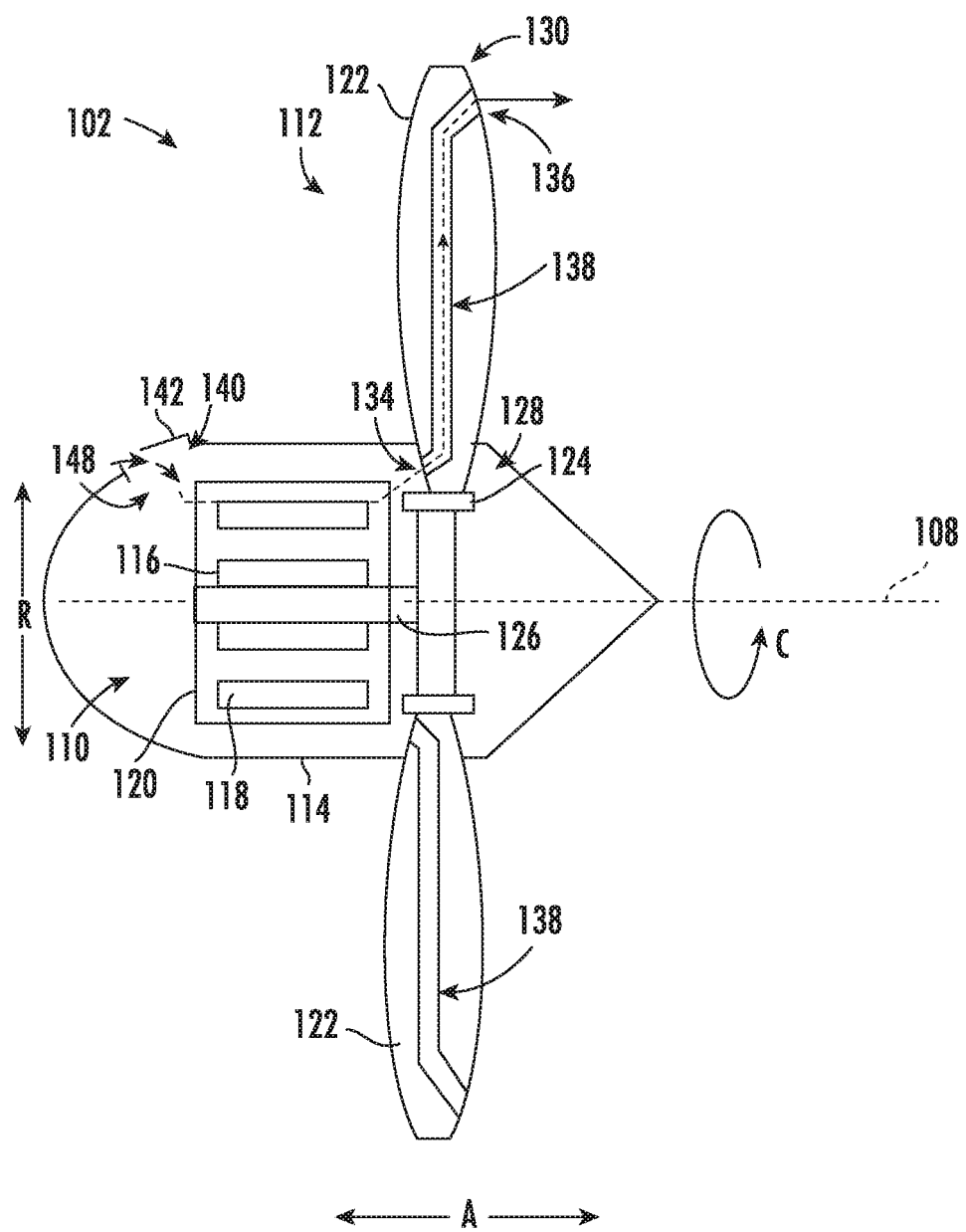
FIG. 4 is a side, schematic view of a propulsion engine in accordance with another embodiment of the present disclosure.

It will further be appreciated that in other embodiments of the present disclosure, the propulsion engine 102 may have any other suitable configuration. For example, although for the embodiment of FIGS. 2 and 3, the electric machine 110 is positioned aft/downstream of the fan 112, in other embodiments, the electric machine 110 may have any other suitable configuration. For example, referring briefly to FIG. 4, a schematic view is provided of a propulsion engine 102 in accordance with another exemplary embodiment of the present disclosure. The propulsion engine 102 of FIG. 4 is configured in substantially the same manner as the propulsion engine 102 of FIGS. 2 and 3. However, for the embodiment of FIG. 4, an electric machine is positioned forward/upstream of a fan 112 of the propulsion engine 102. Notably, with such a configuration, a first end 148 of a cooling air flowpath 132 is further positioned forward/upstream of the fan 112, and further is positioned forward of the electric machine 110.

Figure 5:
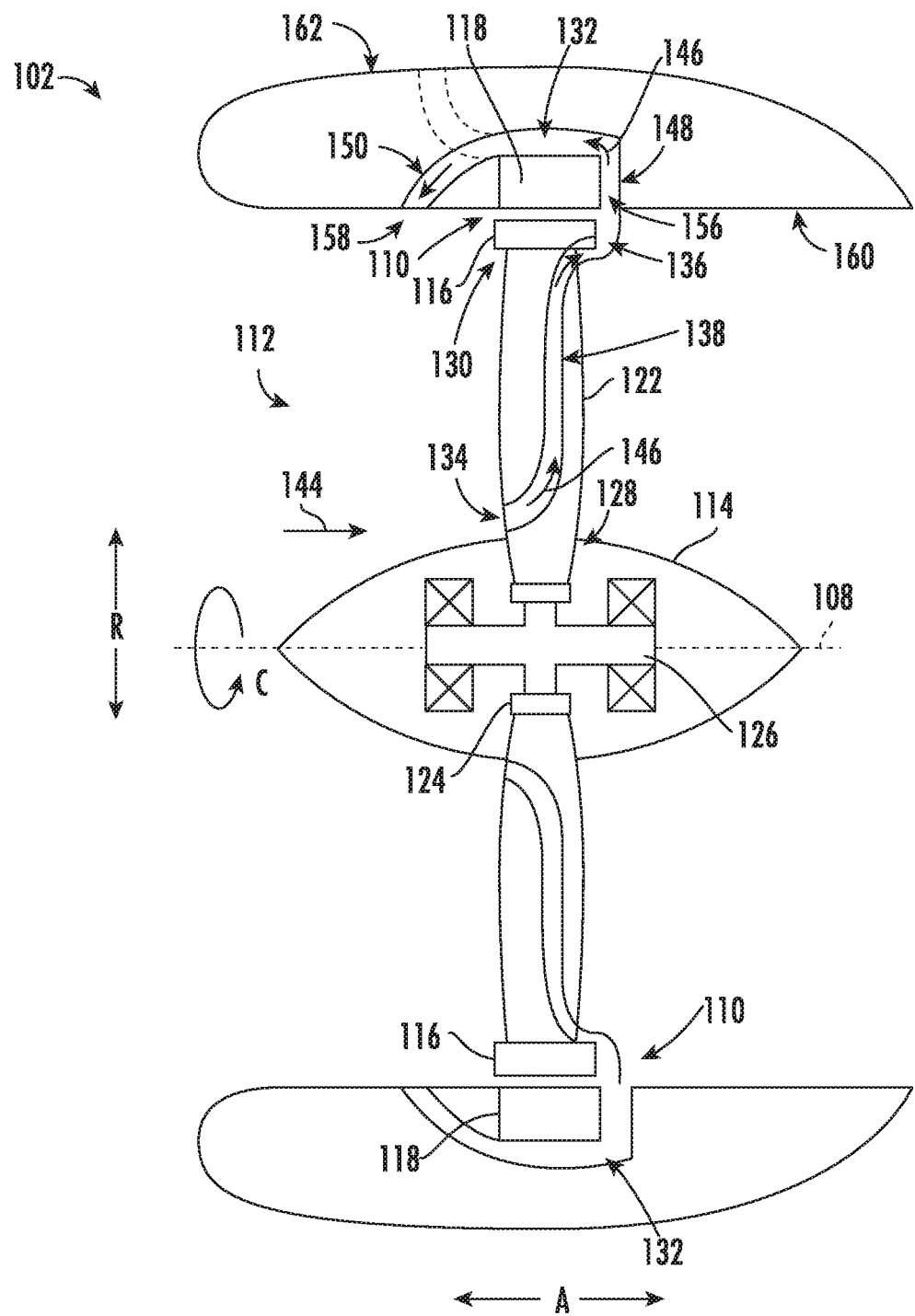
FIG. 5 is a side, schematic view of a propulsion engine in accordance with yet another embodiment of the present disclosure.

Further, in still other exemplary embodiments, referring now to FIG. 5, a propulsion engine 102 in accordance with another exemplary embodiment of the present disclosure is provided. The exemplary propulsion engine 102 of FIG. 5 may be configured in substantially the same manner as exemplary propulsion engine 102 of FIGS. 2 and 3.

For example, the exemplary propulsion engine 102 of FIG. 5 generally includes an electric machine 110 having a rotor 116 and a stator 118, a fan 112 having a fan blade 122 attached to the rotor 116 of the electric machine 110 and extending generally along the radial direction R, and a cowling 114. Additionally, the propulsion engine 102 defines a cooling air flowpath 132 in thermal communication with the electric machine 110, and the fan blade 122 defines an inlet 134, an outlet 136, and a cooling air passage 138 extending between the inlet 134 and the outlet 136, with the cooling air passage 138 being in airflow communication with the cooling air flowpath 132 of the propulsion engine 102.

Further, the fan blade 122 of the fan 112 is attached to the rotor 116 of the electric machine 110 and extends generally between an inner end 128 and an outer end 130 along the radial direction R. The inner end 128 of the fan blade 122 of the fan 112 is at least partially enclosed within the cowling 114. However, for the embodiment shown, the fan blade 122 is not coupled to the rotor 116 of the electric machine 110 at the inner end 128, and instead the outer end 130 of the fan blade 122 is coupled to the rotor 116 of the electric machine 110. In such a manner, it will be appreciated that the electric machine 110 is generally configured as a rim motor. More specifically, for the embodiment shown, the propulsion engine 102 further includes an outer nacelle 154. The stator 118 of the electric machine 110 is coupled to, or otherwise positioned within, the outer nacelle 154. The rotor 116 of the electric machine 110 is coupled to the outer end 130 of the fan blade 122, or rather, the outer ends 130 of the plurality of fan blades 122 of the fan 112. In such a manner, the electric machine 110 may drive the fan 112 by rotating the outer ends 130 of the plurality of fan blades 122.

Notably, with such a configuration, the outlet 136 of the fan blade 122 is again defined at the outer end 130 of the fan blade 122 and the fan 112 is configured to provide a cooling airflow 146 through the cooling air passage 138 to the cooling air flowpath 132 of the electric machine 110. Notably, the cooling air flowpath 132 extends generally between a first end 148 in airflow communication with a first opening 156 in the outer nacelle 154, aft of the fan blade 122 and aft of the stator 118, to a second end 150 in airflow communication with a second opening 158 in the outer nacelle 154, forward of the fan blade 122 and forward of the stator 118. The first and second openings 156, 158 in the outer nacelle 154 are defined on an inside surface 160 of the outer nacelle 154. However, as is depicted in phantom, in other embodiments, the second opening 158 may instead be defined on an outer surface 162 of the outer nacelle 154 (or elsewhere). Further, in other embodiments, the cooling air flowpath 132 may extend in any other suitable manner.

It will further be appreciated that in still other exemplary embodiments, the propulsion engine 102 may be any other suitable propulsion engine 102. For example, referring now to FIG. 6, the propulsion engine 102 may be a gas turbine engine. More specifically, for the embodiment of FIG. 6, the propulsion engine 102 is configured as a high-bypass turbofan jet engine 200, herein referred to as "turbofan 200."

Figure 6:
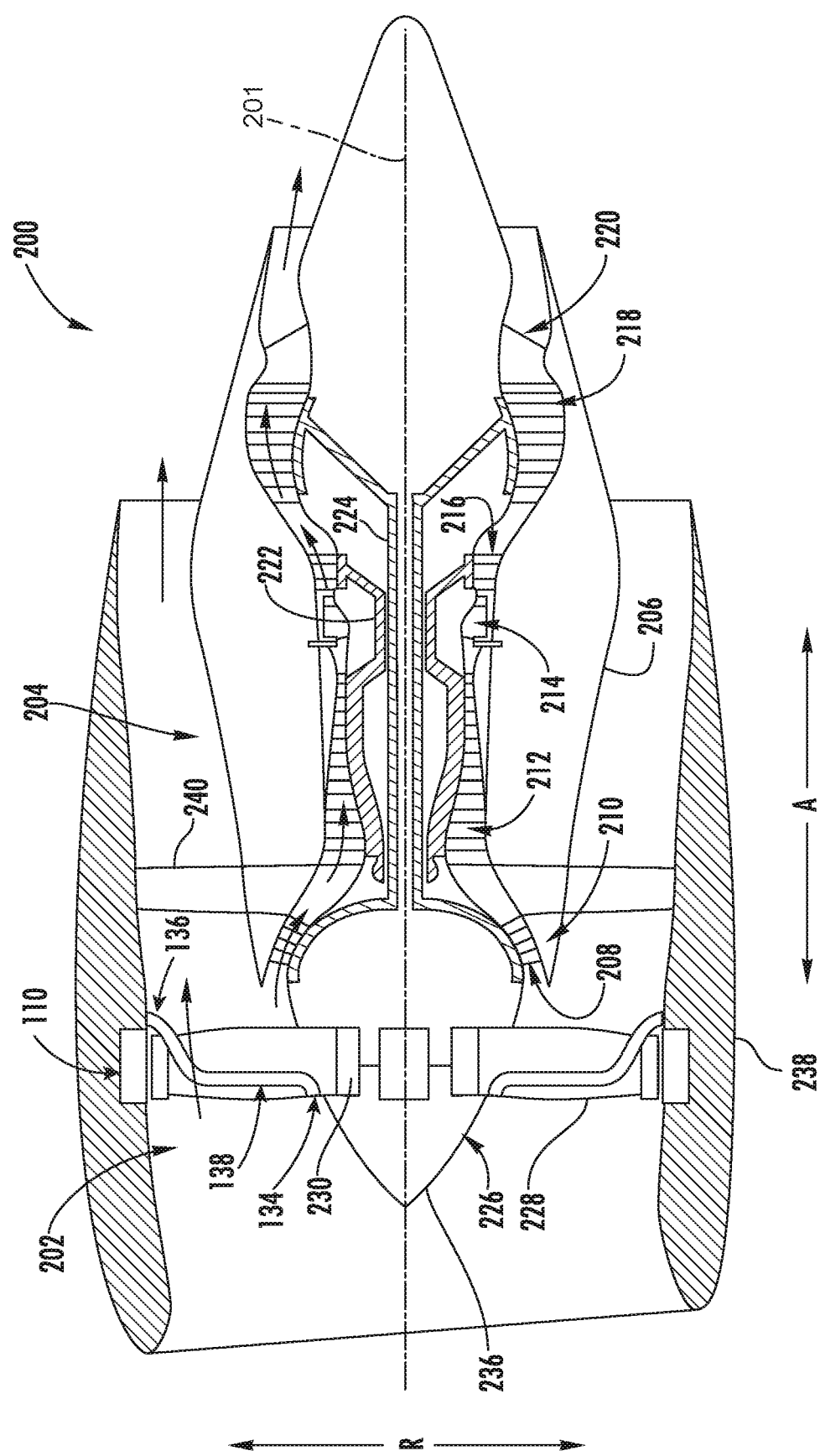
FIG. 6 is a schematic, cross-sectional view of a gas turbine engine in accordance with an exemplary aspect of the present disclosure.

As shown in FIG. 6, the turbofan 200 defines an axial direction A (extending parallel to a longitudinal centerline 201 provided for reference), a radial direction R, and a circumferential direction (extending about the axial direction A; not depicted in FIG. 6). In general, the turbofan 200 includes a fan section 202 and a turbomachine 204 disposed downstream from the fan section 202.

Briefly, the exemplary turbomachine 204 depicted generally includes a substantially tubular outer casing 206 that defines an annular inlet 208. The outer casing 206 encases, in serial flow relationship, a compressor section including a booster or low pressure (LP) compressor 210 and a high pressure (HP) compressor 212; a combustion section 214; a turbine section including a high pressure (HP) turbine 216 and a low pressure (LP) turbine 218; and a jet exhaust nozzle section 220. A high pressure (HP) shaft or spool 222 drivingly connects the HP turbine 216 to the HP compressor 212. A low pressure (LP) shaft or spool 224 drivingly connects the LP turbine 218 to the LP compressor 210.

For the embodiment depicted, the fan section 202 includes a fan 226 having a plurality of fan blades 228 coupled to a disk 230 in a spaced apart manner. The disk 230 is covered by rotatable front hub 236. As is depicted, the fan blades 228 extend outwardly from disk 230 generally along the radial direction R. Additionally, the exemplary fan section 202 includes an annular fan casing or outer nacelle 238 that circumferentially surrounds the fan 226 and/or at least a portion of the turbomachine 204. The nacelle 238 is supported relative to the turbomachine 204 by a plurality of circumferentially-spaced outlet guide vanes 240.

Notably, the turbofan 200 of FIG. 6 may incorporate aspects of one or more of the exemplary propulsion engines 102 described above with reference to FIGS. 2 through 5. For example, as noted above the exemplary fan section 202 of the turbofan 200 includes the fan 226 having the respective plurality of fan blades 228. Further, the fan 226 of the fan section 202 includes an electric machine 110. The electric machine 110 is configured as a rim motor, similar to the exemplary fan 112 and electric machine 110 described above with reference to FIG. 5. Additionally, the plurality of fan blades 228 of the fan 226 each define a cooling airflow passage 138 extending between an inlet 134 and an outlet 136 and in airflow communication with a cooling air flowpath 132 of the propulsion engine/turbofan 200 (not shown in FIG. 6), for providing a cooling airflow to the cooling air flowpath 132 during operation. Such a configuration may therefore provide for cooling of the electric machine 110 during operation of the propulsion engine 102 without requiring separate, relatively complicated thermal management systems for the electric machine 110.

Notably, the electric machine 110 may drive the fan 226 during operation of the turbofan 200. In such a manner, the fan 226 may be driven at a different rotational speed than the turbomachine 204, such as the LP shaft 224 of the turbomachine 204. Although not depicted, in certain embodiments, the turbomachine 204, such as the LP shaft 224 of the turbomachine 204, may further drive a separate electric machine (operable as an electric generator) for extracting power from the turbomachine 204 and driving the fan 226.

It should be appreciated, however, that the exemplary turbofan engine 200 depicted in FIG. 6 is provided by way of example only, and that in other exemplary embodiments, the turbofan engine 200 may have any other suitable configuration. For example, in other exemplary embodiments, the turbofan engine 200 may be configured as a turboprop engine, a turbojet engine, a differently configured turbofan engine, or any other suitable gas turbine engine.

Moreover, although throughout the present application the cooling air passage 138 is described as being used to induce a cooling airflow over an electric machine 110, in other embodiments, the cooling air passage 138 may additionally or alternatively be used to generate a cooling airflow over any other suitable components of a gas turbine engine, an electric propulsion engine, or a combination thereof. For example, the cooling air passage 138 may be used to generate a cooling airflow over/through a gearbox, a lubricating oil system, or any other component or system of the gas turbine engine, electric propulsion engine, hybrid electric engine, etc.

Further, although the cooling air passage 138 is described as providing a cooling airflow 146 through a cooling air flowpath 132 during operation, in other embodiments, the configurations described herein may not necessarily be used for cooling (e.g., the cooling air passage 138 may simply be an air passage for providing an airflow through an air flowpath). In such an exemplary embodiment, the air passage may be configured for providing air for purposes other than, or in addition to, cooling, such as for anti-icing, for an aircraft system (such as an aircraft cabin system), etc.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A propulsion engine for an aeronautical vehicle defining a radial direction and an air flowpath, the propulsion engine comprising:
an electrical power source positioned within a casing, the air flowpath being partially defined within the casing; and
a fan comprising a fan blade rotatable by the electrical power source and extending generally along the radial direction, the fan blade defining an inlet, an outlet, and an air passage extending between the inlet and the outlet and in airflow communication with the air flowpath, the inlet being positioned inward from the outlet along the radial direction to provide an airflow through the air flowpath.

2. The propulsion engine of claim 1, wherein the electrical power source is an electric machine comprising a rotor and a stator, wherein the air flowpath is a cooling air flowpath in thermal communication with the electric machine, and wherein the fan blade is attached to the rotor of the electric machine.

3. The propulsion engine of claim 1, wherein the fan blade of the fan defines an inner end and an outer end along the radial direction, wherein the inlet is defined at the inner end, and wherein the outlet is defined at the outer end.

4. The propulsion engine of claim 3, wherein the electrical power source is an electric machine comprising a rotor and a stator, wherein the inner end of the fan blade is coupled to the rotor of the electric machine, and wherein the fan is configured to induce an airflow through the air flowpath.

5. The propulsion engine of claim 1, wherein the propulsion engine comprises a cowling, wherein the casing is positioned within the cowling, and wherein the inlet of the fan blade is also positioned within the cowling.

6. The propulsion engine of claim 5, wherein the cowling defines an opening, wherein the air flowpath extends from a first end through the casing to a second end, wherein the first end is in airflow communication with the opening of the cowling, and wherein the second end is in airflow communication with the inlet of the fan blade.

7. The propulsion engine of claim 6, wherein the opening of the cowling is positioned aft of the fan blade of the fan.

8. The propulsion engine of claim 1, wherein the electrical power source is an electric machine comprising a rotor and a stator, wherein the air flowpath is a cooling air flowpath of the propulsion engine defined at least in part by the electric machine and is in thermal communication with the stator of the electric machine.

9. The propulsion engine of claim 1, wherein the propulsion engine is an electric fan, and wherein the electrical power source is an electric motor.

10. The propulsion engine of claim 1, wherein the electrical power source is an electric machine, wherein the propulsion engine is a gas turbine engine comprising a fan section and a turbomachine, and wherein the fan section comprises the fan and the electric machine.

11. The propulsion engine of claim 1, wherein the fan blade is a first fan blade of a plurality of fan blades of the fan, wherein each of the plurality of fan blades of the fan defines a respective inlet, a respective outlet, and a respective air passage extending between the respective inlet and outlet, and wherein each of the respective air passages of the plurality of fan blades is in airflow communication with the air flowpath.

12. An aeronautical vehicle comprising:
a fuselage;
a wing coupled to and extending from the fuselage; and
a propulsion system including one or more propulsion engines coupled to the fuselage, the wing, or both, each of the one or more propulsion engines defining a cooling air flowpath and comprising
an electrical power source; and
a fan comprising a fan blade rotatable by the respective electrical power source and extending generally along the radial direction, the fan blade defining an inlet, an outlet, and a cooling air passage extending between the inlet and the outlet and in airflow communication with the respective cooling air flowpath, the inlet being positioned inward from the outlet along the radial direction to provide a cooling airflow through the cooling air flowpath, wherein at least a portion of a rotor is positioned along the fan blade outward from the outlet along the radial direction.

13. The aeronautical vehicle of claim 12, wherein the one or more propulsion engines comprises at least two propulsion engines.

14. The aeronautical vehicle of claim 12, wherein the fan blade of the fan of each propulsion engine defines an inner end and an outer end along the radial direction, wherein the inlet is defined at the inner end, and wherein the outlet is defined at the outer end.

15. The aeronautical vehicle of claim 12, wherein the fan blade of the fan of each propulsion engine defines an inner end and an outer end along the radial direction, wherein the inlet is defined at the inner end, wherein the outlet is defined at the outer end, wherein the outer end of the fan blade is coupled to the electrical power source of the respective propulsion engine, and wherein the fan of the respective propulsion engine is configured to provide the cooling airflow to the cooling air flowpath of the respective propulsion engine.

16. An aeronautical vehicle comprising:
a fuselage;
a wing coupled to and extending from the fuselage; and
a propulsion system including one or more propulsion engines coupled to the fuselage, the wing, or both, each of the one or more propulsion engines defining a cooling air flowpath and comprising:
an electrical power source; and a fan comprising a fan blade rotatable by the respective electrical power source and extending generally along the radial direction, the fan blade further defining an inner end and an outer end along the radial direction, wherein an inlet is defined at the inner end, wherein an outlet is defined at the outer end, wherein the outer end of the fan blade is coupled to the electrical power source of the respective propulsion engine, and wherein the fan of the respective propulsion engine is configured to provide the cooling airflow to the cooling air flowpath of the respective propulsion engine.

* * * * *